United States Patent
Kuo et al.

(10) Patent No.: US 12,148,132 B2
(45) Date of Patent: Nov. 19, 2024

(54) IMAGE CALIBRATION METHOD AND IMAGE CALIBRATION APPARATUS

(71) Applicant: ALTEK SEMICONDUCTOR CORPORATION, Hsinchu (TW)

(72) Inventors: Yu-Chen Kuo, Hsinchu (TW); Yu-Ting Lin, Hsinchu (TW); Kuo-Chang Chen, Hsinchu (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 499 days.

(21) Appl. No.: 17/585,596

(22) Filed: Jan. 27, 2022

(65) Prior Publication Data

US 2023/0237626 A1     Jul. 27, 2023

(51) Int. Cl.
*G06T 7/194*        (2017.01)
*G06T 3/40*         (2024.01)
(Continued)

(52) U.S. Cl.
CPC ............ *G06T 5/80* (2024.01); *G06T 3/40* (2013.01); *G06T 5/50* (2013.01); *G06T 5/77* (2024.01);
(Continued)

(58) Field of Classification Search
CPC . G06T 7/194; G06T 7/11; G06T 2207/20081; G06T 3/047; G06T 5/50; G06T 7/174; G06T 7/10; G06T 2207/30196; G06T 5/80; G06T 7/75; G06T 2207/20221; G06T 3/40; G06T 5/60; G06T 7/80; G06T 7/66; G06T 7/33; G06T 5/77;
(Continued)

(56) References Cited

U.S. PATENT DOCUMENTS

| | | | | |
|---|---|---|---|---|
| 10,089,753 B1* | 10/2018 | Fegyver | ............. | G06T 7/73 |
| 2003/0156203 A1* | 8/2003 | Kondo | ............. | H04N 5/272 |
| | | | | 348/E5.052 |

(Continued)

FOREIGN PATENT DOCUMENTS

| | | |
|---|---|---|
| CN | 101571950 A | 11/2009 |
| CN | 111882497 A | 11/2020 |

(Continued)

*Primary Examiner* — Aaron W Carter
*Assistant Examiner* — Courtney Joan Nelson
(74) *Attorney, Agent, or Firm* — Winston Hsu

(57) ABSTRACT

An image calibration method applied to a wide-angle image and executed by an image calibration apparatus includes applying primary lens distortion correction for the wide-angle image to generate a corrected image, segmenting an foreground image from the corrected image to generate a background image, applying secondary distortion correction for the foreground image based on the pre-defined object to generate a calibrated foreground image, fusing the background image with the calibrated foreground image to generate a fused image, detecting at least one residual empty pixel not overlapped by the calibrated foreground image within the fused image, and utilizing a machine learning algorithm to fill the at least one residual empty pixel of the fused image by extending the background image to provide an output image. The foreground image contains feature pixels relate to a pre-defined object and the background image has empty pixels corresponding to the foreground image.

20 Claims, 11 Drawing Sheets

(51) Int. Cl.
    *G06T 5/50*         (2006.01)
    *G06T 5/77*         (2024.01)
    *G06T 5/80*         (2024.01)
    *G06T 7/33*         (2017.01)
    *G06T 7/66*         (2017.01)

(52) U.S. Cl.
    CPC ............... *G06T 7/194* (2017.01); *G06T 7/33* (2017.01); *G06T 7/66* (2017.01); *G06T 2207/20081* (2013.01); *G06T 2207/20221* (2013.01)

(58) Field of Classification Search
    CPC ........ G06V 10/82; G06V 10/16; G06V 10/80; G06V 30/147; G06V 30/1607; H04N 5/272; H04N 5/2628; H04N 23/80
    See application file for complete search history.

(56) References Cited

U.S. PATENT DOCUMENTS

| | | | | |
|---|---|---|---|---|
| 2016/0300334 A1* | 10/2016 | Chen | ...................... | G06V 20/52 |
| 2022/0138985 A1* | 5/2022 | Li | ............................. | G06T 5/80 |
| | | | | 382/173 |

FOREIGN PATENT DOCUMENTS

| | | |
|---|---|---|
| CN | 112529784 A | 3/2021 |
| TW | 202016798 A | 5/2020 |

\* cited by examiner

IMAGE CALIBRATION METHOD AND IMAGE CALIBRATION APPARATUS

BACKGROUND OF THE INVENTION

1. Field of the Invention

The present invention relates to an image calibration method and an image calibration apparatus, and more particularly, to an image calibration method to correct image distortion captured by wide angle camera.

2. Description of the Prior Art

With the advanced technology, the wide-angle camera is used in various application to acquire an image with wider visible range. The wide-angle image captured by the wide-angle camera has dramatical distortion in the corner regions. One conventional solution applies distortion correction in the corner region of the wide-angle image, but objects in the region such as human or building will be looked unnaturally after correction. Another conventional solution segments the foreground and the background from the corner region of the wide-angle image, and calibrates the background (such as an outline of the building or a road marking) to transform the distorted line into the straight line and further applies the distortion correction for the foreground (such as a human) to acquire a natural external form of the human; however, a part of the background close to the foreground still has unnatural distortion.

SUMMARY OF THE INVENTION

The present invention provides an image calibration method of providing foreground and background performance and a related image calibration apparatus for solving above drawbacks.

According to the claimed invention, an image calibration method applied to a wide-angle image includes applying primary lens distortion correction for the wide-angle image to generate a corrected image, segmenting an foreground image from the corrected image to generate a background image, applying secondary distortion correction for the foreground image based on the pre-defined object to generate a calibrated foreground image, fusing the background image with the calibrated foreground image to generate a fused image, detecting at least one residual empty pixel not overlapped by the calibrated foreground image within the fused image, and utilizing a machine learning algorithm to fill the at least one residual empty pixel of the fused image by extending the background image to provide an output image. The foreground image contains feature pixels relate to a pre-defined object and the background image has empty pixels corresponding to the foreground image.

According to the claimed invention, the image calibration method further includes detecting the feature pixels relate to the pre-defined object in the corrected image by the machine learning algorithm.

According to the claimed invention, fusing the background image with the calibrated foreground image to generate the fused image further includes determining a background center related to the empty pixels corresponding to the foreground image in the background image, determining a geometric center related to the pre-defined object in the foreground image, and fusing the background image with the calibrated foreground image by aligning the background center with the geometric center.

According to the claimed invention, applying the secondary distortion correction for the foreground image based on the pre-defined object to generate the calibrated foreground image further includes morphing the feature pixels relate to the pre-defined object in the foreground image based on the pre-defined object to generate a morphed foreground image, and rescaling and shifting the morphed foreground image to generate the calibrated foreground image.

According to the claimed invention, morphing the feature pixels relate to the pre-defined object in the foreground image based on the pre-defined object to generate the morphed foreground image further includes detecting top pixels representing a top feature, body pixels representing a body feature and button pixels representing a button feature in the feature pixels related to the pre-defined object, and morphing the top pixels, the body pixels and the button pixels respectively based on a plurality of parameters according to the top feature, the body feature and the button feature of the pre-defined object to generate the morphed foreground image.

According to the claimed invention, morphing the feature pixels relate to the pre-defined object in the foreground image based on the pre-defined object to generate the morphed foreground image further includes morphing the top pixels, the body pixels and the button pixels according to geometric centers of the top pixels, the body pixels and the button pixels to generate the morphed foreground image.

According to the claimed invention, morphing the feature pixels relate to the pre-defined object in the foreground image based on the pre-defined object to generate the morphed foreground image further includes determining whether the pre-defined object is a human, and setting the top feature, the body feature and the button feature respectively are the face, the body and the feet of the human when the pre-defined object is the human.

According to the claimed invention, utilizing the machine learning algorithm to fill the at least one residual empty pixel of the fused image by extending the background image to provide the output image further includes using several pixels of the background image adjacent to the empty pixels to fill the at least one residual empty pixel of the fused image.

According to the claimed invention, utilizing the machine learning algorithm to fill the at least one residual empty pixel of the fused image by extending the background image to provide the output image further includes filling the at least one residual empty pixel of the fused image in accordance with a geometric feature distribution trend of the background image.

According to the claimed invention, rescaling and shifting the morphed foreground image to generate the calibrated foreground image further includes comparing a size of the at least one residual empty pixel of the fused image with a predetermined threshold, and rescaling the morphed foreground image in response to the size of the at least one residual empty pixel larger than the predetermined threshold.

According to the claimed invention, an image calibration apparatus includes a wide-angle image sensor and an operation processor. The wide-angle image sensor is adapted to provide a wide-angle image. The operation processor is electrically connected to the wide-angle image sensor. The operation processor is adapted to apply primary lens distortion correction for the wide-angle image to generate a corrected image, segment an foreground image from the corrected image to generate a background image, apply secondary distortion correction for the foreground image based on the pre-defined object to generate a calibrated foreground image, fuse the background image with the calibrated foreground image to generate a fused image, detect at least one residual empty pixel not overlapped by the calibrated foreground image within the fused image, and utilizing a machine learning engine to fill the at least one residual empty pixel of the fused image by extending the background image to provide an output image. The foreground image contains feature pixels relate to a pre-defined object and the background image has empty pixels corresponding to the foreground image.

The image calibration method and the related image calibration apparatus of the present invention can be used to calibrate the wide-angle image for transforming the deformed shape of the pre-defined object into the actual form and providing the background without the distorted outlines. The image calibration method can apply the primary lens distortion correction for the wide-angle image to acquire the corrected image for a start. The background in the corrected image can have the accurate and straight outlines, and the foreground in the corrected image may be still deformed, so that the image calibration method can segment the foreground image and the background image from the corrected image to apply the secondary distortion correction for the foreground image. Then, the calibrated foreground image can be fused with the background image to acquire the fused image, and the fused image may have the residual empty pixels due to the secondary distortion correction applied for the foreground image. Therefore, the present invention can utilize machine learning technology to predict and estimate data for filling the residual empty pixels in the fused image to generate the output image with the non-deformed foreground and the non-distorted background.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
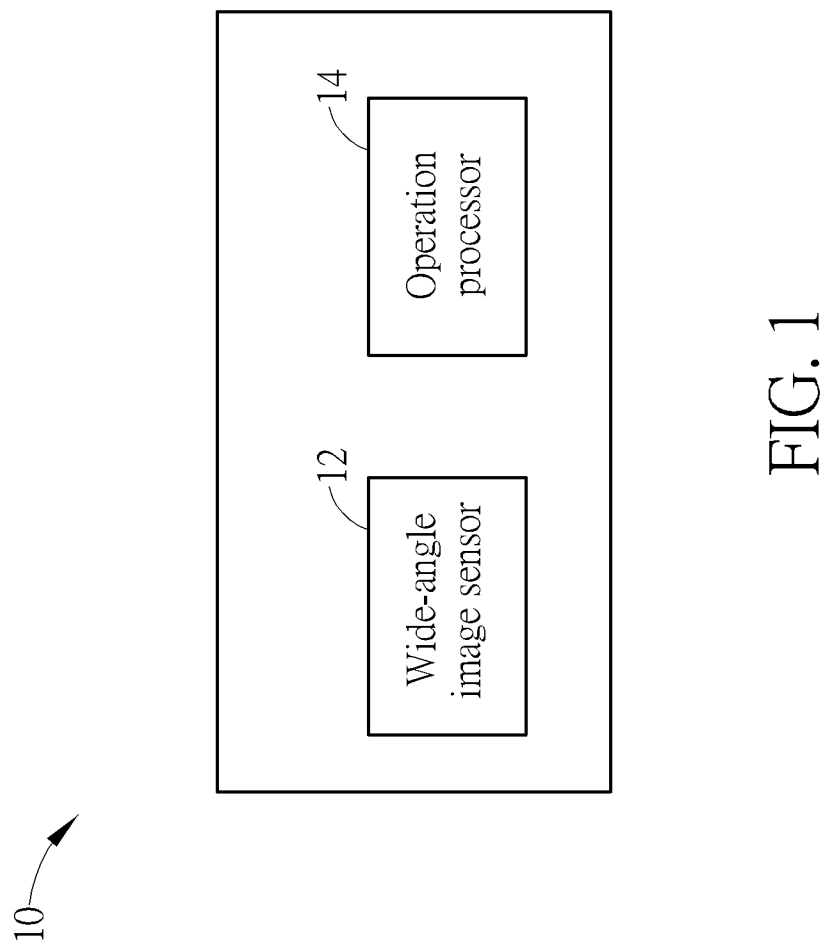
FIG. 1 is a functional block diagram of an image calibration apparatus according to an embodiment of the present invention.
Figure 2:
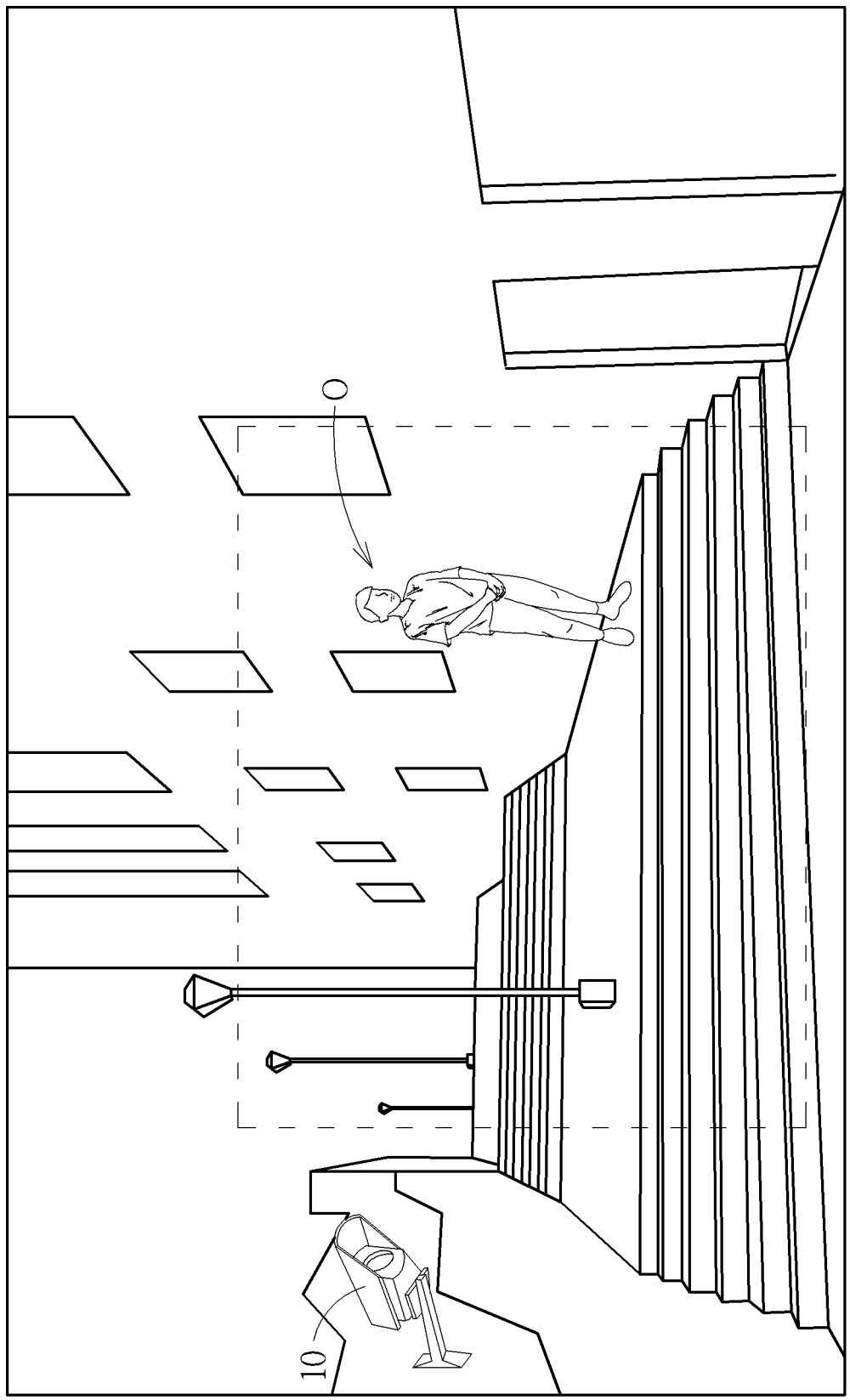
FIG. 2 is an application diagram of the image calibration apparatus according to the embodiment of the present invention.

Please refer to FIG. 1 and FIG. 2. FIG. 1 is a functional block diagram of an image calibration apparatus 10 according to an embodiment of the present invention. FIG. 2 is an application diagram of the image calibration apparatus 10 according to the embodiment of the present invention. The image calibration apparatus 10 can detect a human, a vehicle, or any moving object and any immobile object. The image calibration apparatus 10 can include a wide-angle image sensor 12 and an operation processor 14. The wide-angle image sensor 12 can capture a detection image for detecting the moving object and the immobile object in a visible range of the wide-angle image sensor 12. A pre-defined object O in a corner region of the detection image may be deformed due to the property of wide-angle image sensor 12. The operation processor 14 can be electrically connected to the wide-angle image sensor 12 and used to analyze and calibrate deformation of the pre-defined object O in the detection image. The operation processor 14 can not only apply distortion correction for the pre-defined object O to calibration the deformation, but also calibrate the background in the detection image, so that the image calibration apparatus 10 can provide an output image having the non-deformed foreground and the undistorted background.

Figure 3:
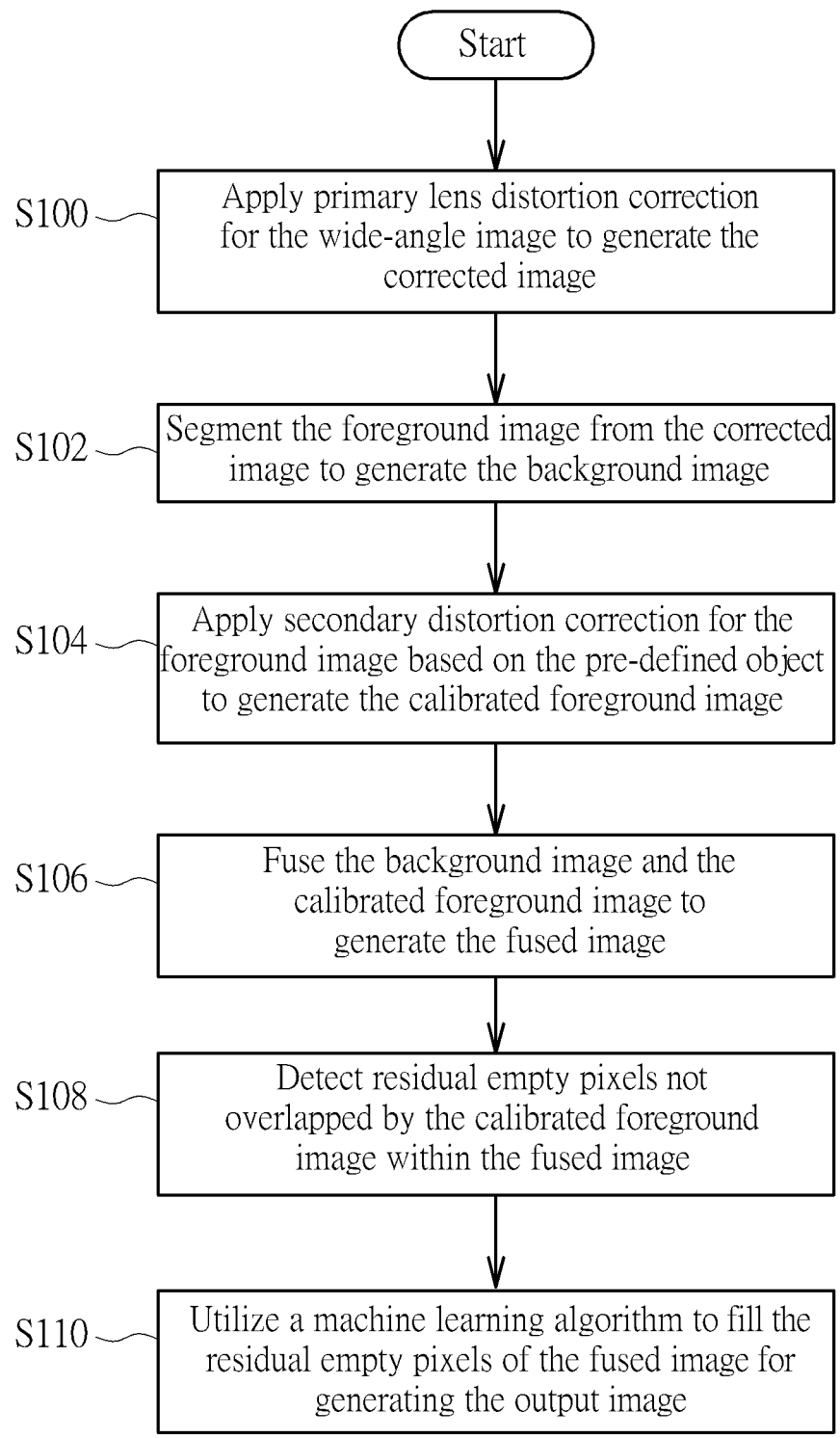
FIG. 3 is a flow chart of the image calibration method according to the embodiment of the present invention.
Figure 4:
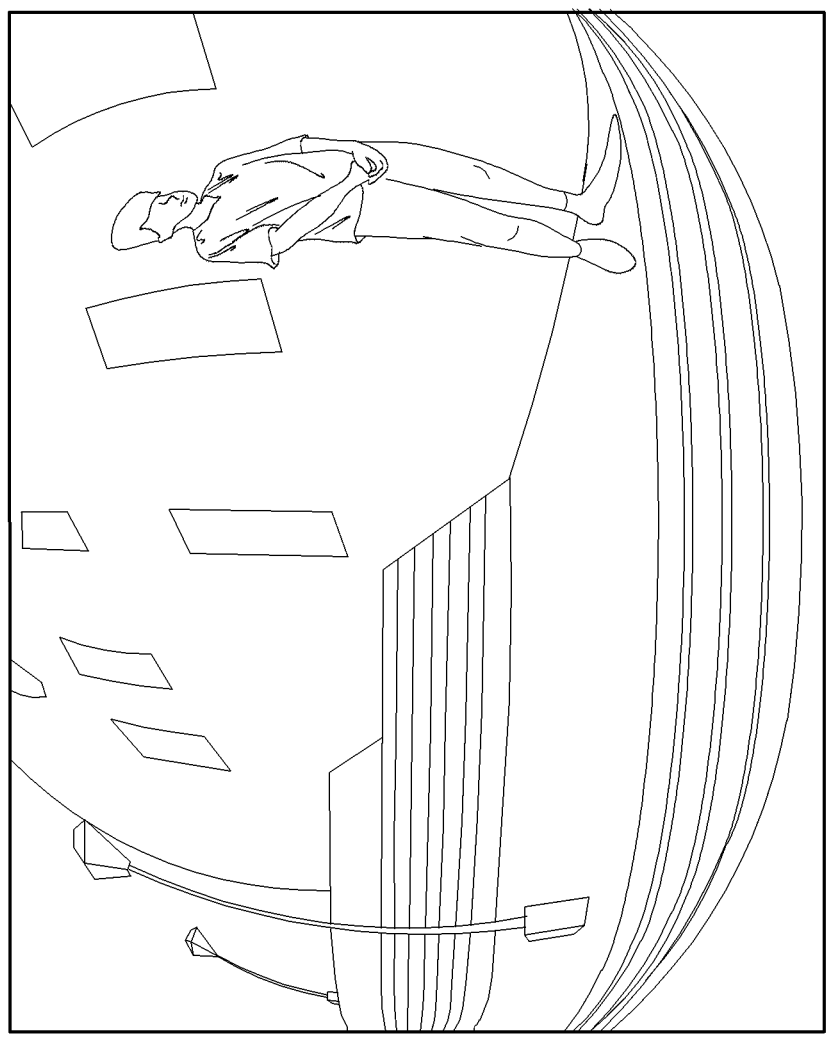
FIG. 4 to FIG. 11 are diagrams of the detection image in different image calibration process according to the embodiment of the present invention.
Figure 5:
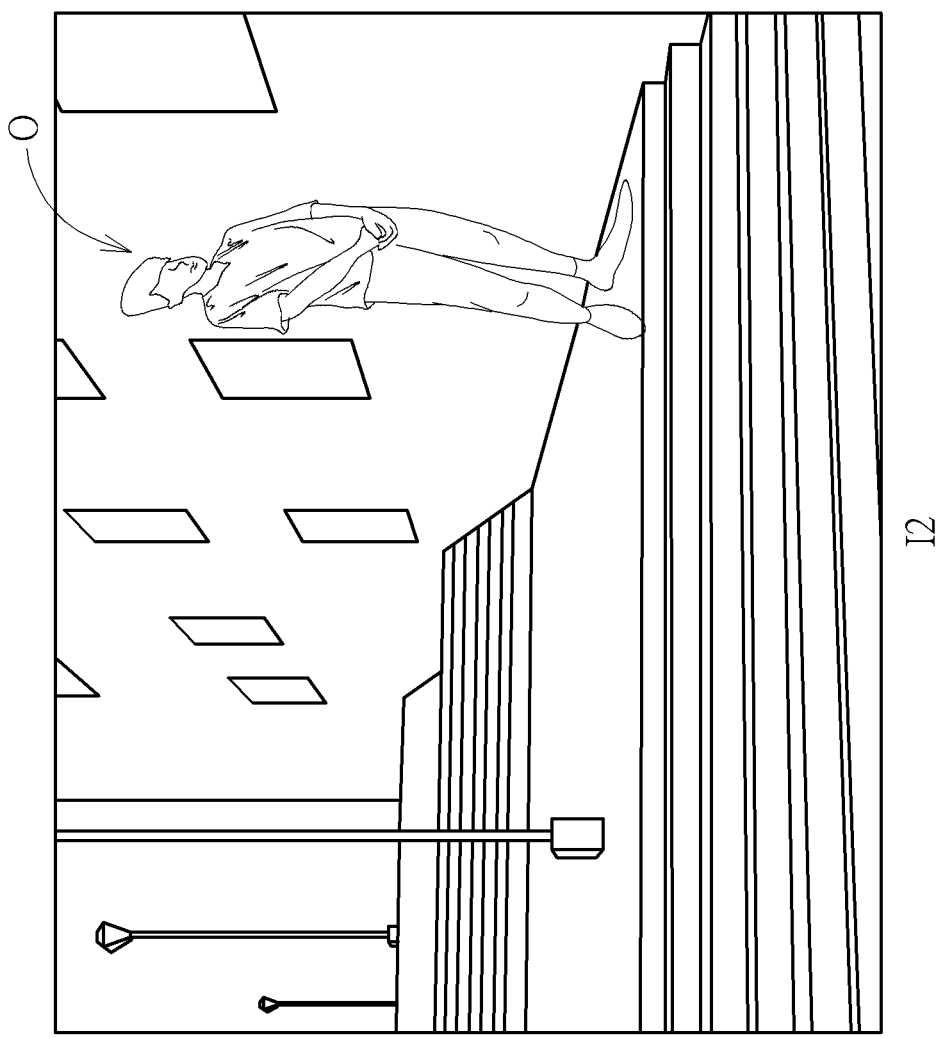

Please refer to FIG. 3 to FIG. 11. FIG. 3 is a flow chart of the image calibration method according to the embodiment of the present invention. FIG. 4 to FIG. 11 are diagrams of the detection image in different image calibration process according to the embodiment of the present invention. The detection image provided by the wide-angle image sensor 12 can be a wide-angle image I1 shown in FIG. 4. Some outlines of articles in the corner region of the wide-angle image I1 are distorted and deformed, and cannot show the actual form of the articles; for example, a shape of the pre-defined object O is deformed, and the outlines of the stairs and the windows are distorted. Therefore, the image calibration method can execute step S100 to apply primary lens distortion correction for the wide-angle image I1 to generate a corrected image I2 shown in FIG. 5. In the corrected image I2, the outlines of the stairs and the windows are calibrated into actual straight lines, but the shape of the pre-defined object O in the corner region is still deformed; for example, the head of the pre-defined object O is extruded and stretched toward the upper right, and the feet of the pre-defined object O are still strange and different from the actual form.

Figure 6:
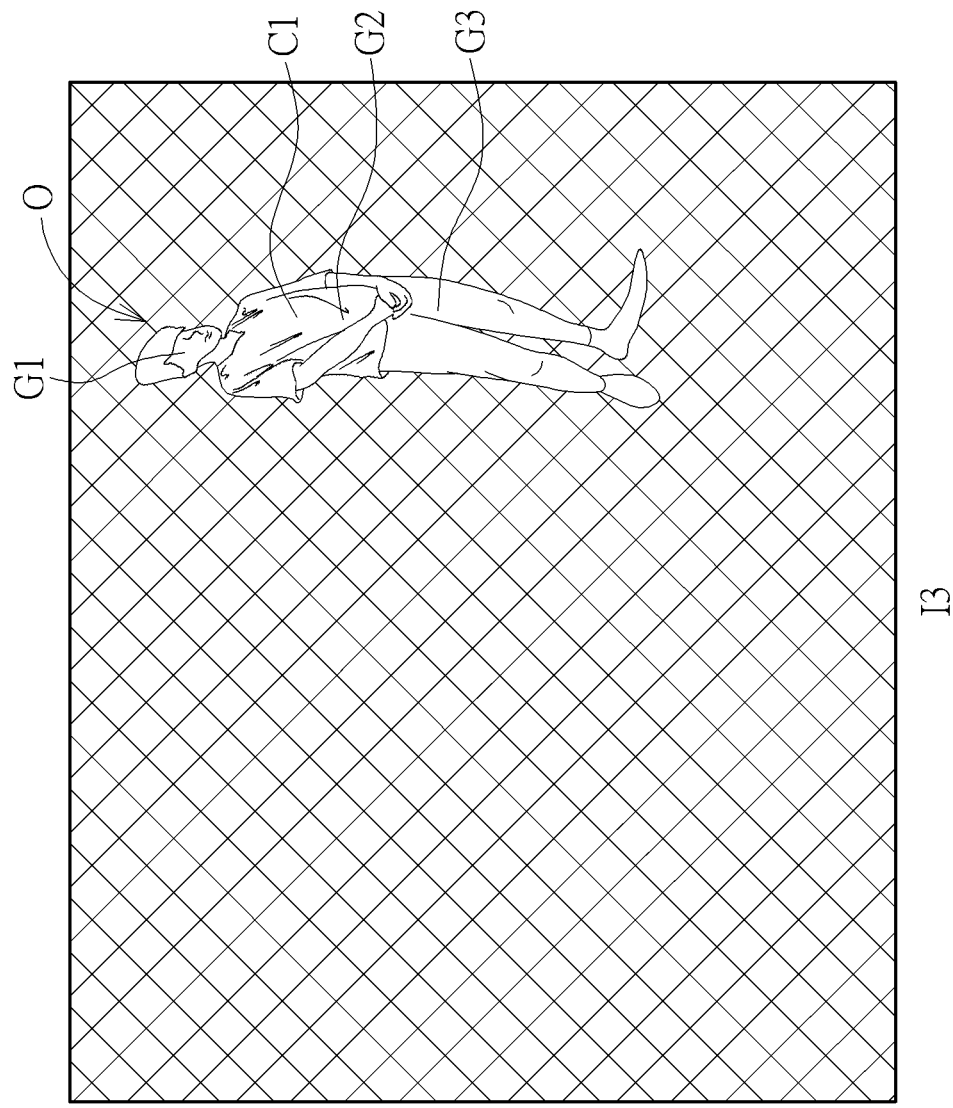
Figure 7:
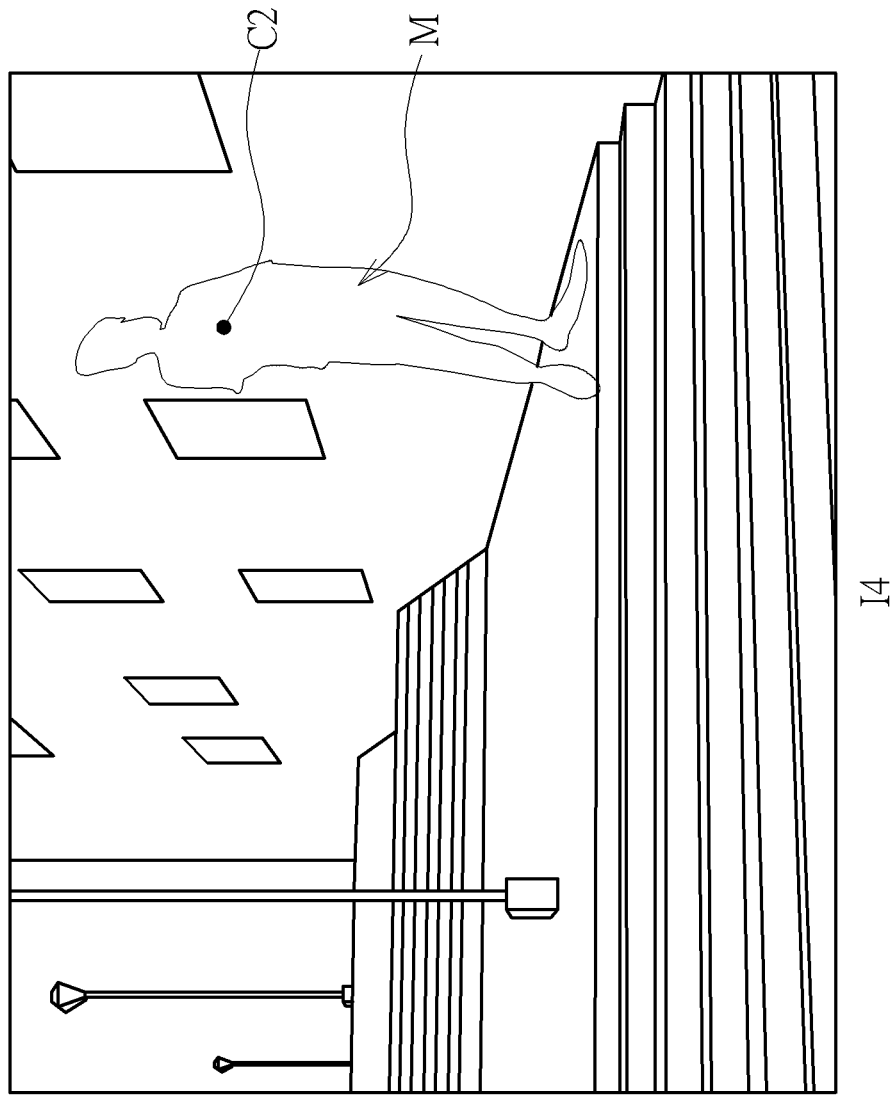
Figure 8:
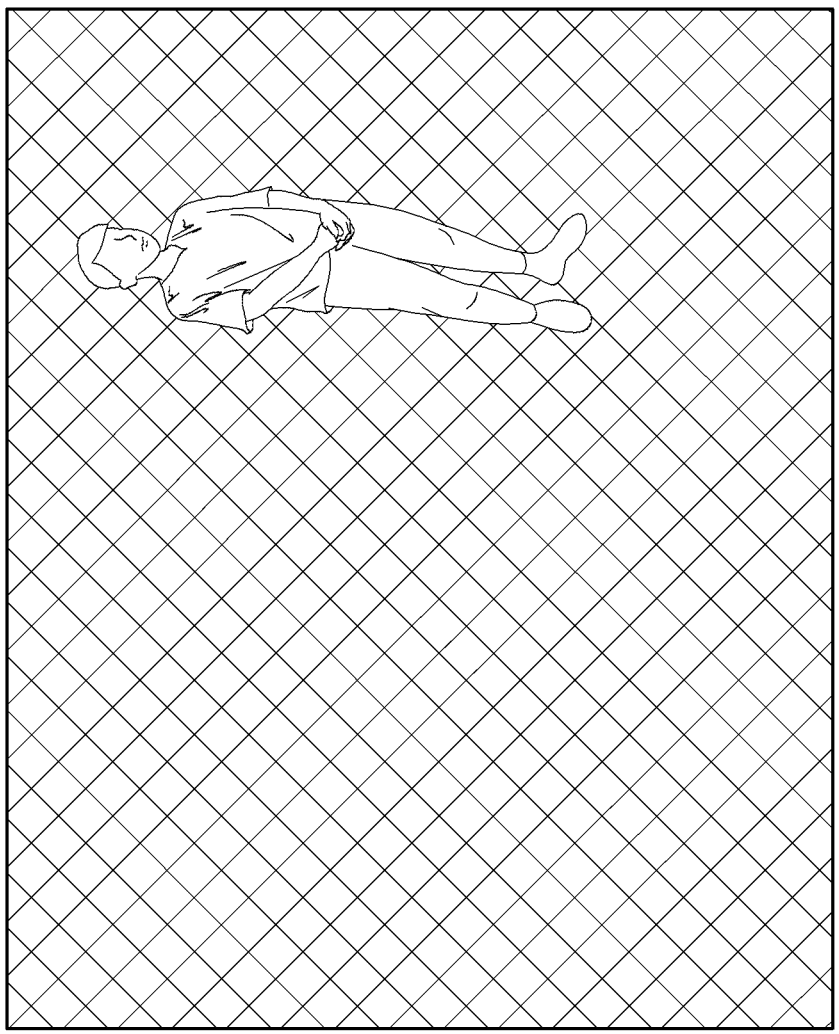

Then, step S102 can be executed to segment a foreground image I3 from the corrected image I2 to generate a background image I4. As shown in FIG. 6, the foreground image I3 can contain feature pixels relate to the pre-defined object O, and an area in the foreground image I3 excluding the pre-defined object O are drawn by plaid. As shown in FIG. 7, the background image I4 can have empty pixels corresponding to the foreground image I3, and the empty pixels in the background image I4 can be defined as a mask M. Then, step S104 can be executed to apply secondary distortion correction for the foreground image I3 based on the pre-defined object O to generate a calibrated foreground image I5 shown in FIG. 8. Comparing variation of the pre-defined object O in FIG. 6 and FIG. 8, the head and the feet of the pre-defined object O can be similar to the actual form after the secondary distortion correction.

Figure 9:
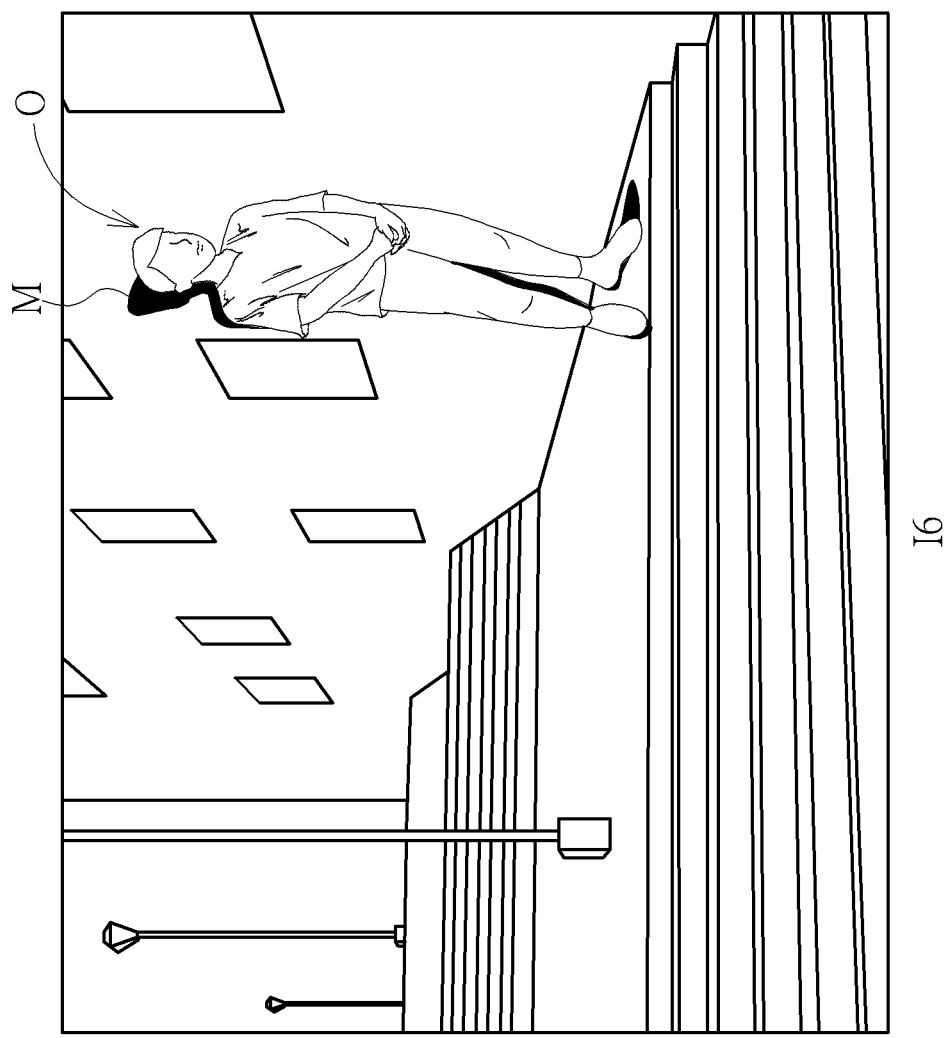
Figure 10:
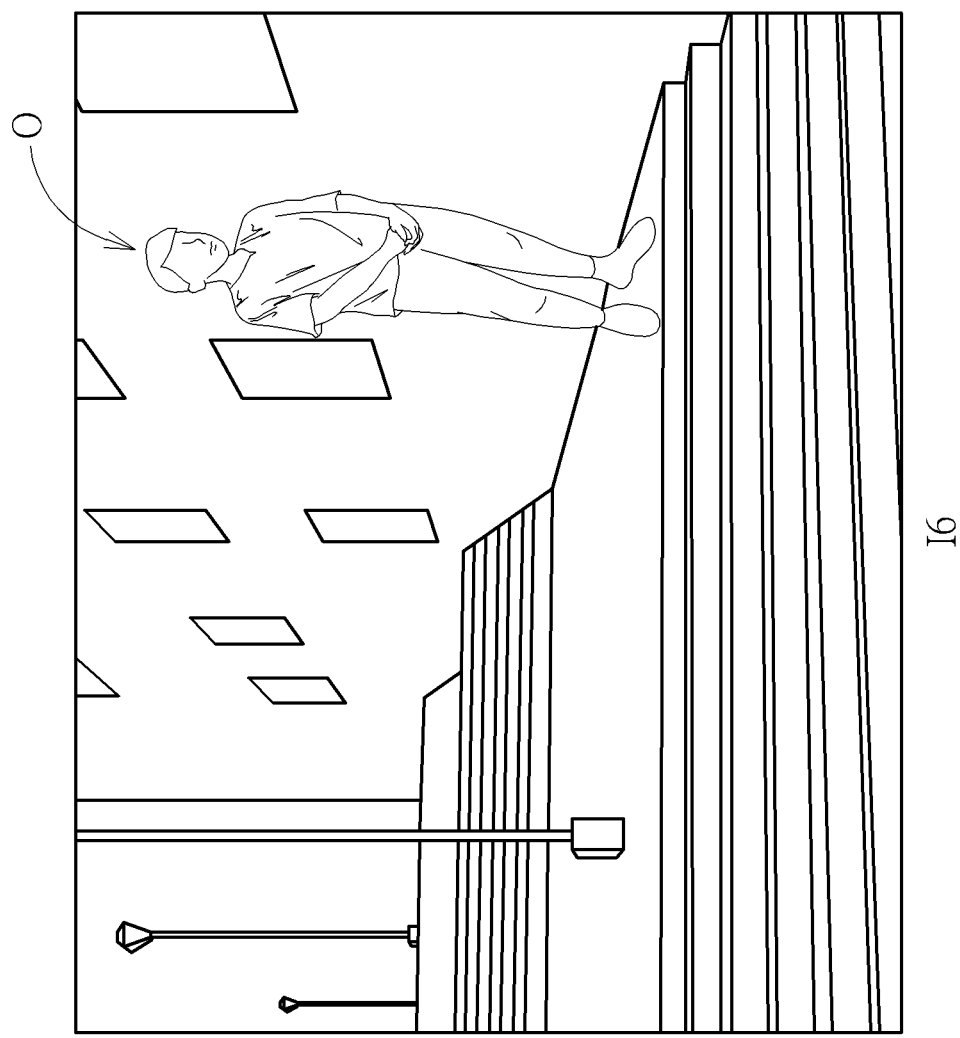

After that, steps S106 and S108 can be executed to fuse the background image I4 and the calibrated foreground image I5 to generate a fused image I6, and detect at least one residual empty pixel not overlapped by the calibrated foreground image I5 within the fused image I6. As shown in FIG. 9, a shape of the mask M is different the shape of the pre-defined object O in the calibrated foreground image I5, so that the mask M has the residual empty pixel in need of filling by the image calibration method of the present invention; a number and distribution of the residual empty pixel can depend on an actual situation, and other possible variation is omitted herein for simplicity. Final, step S110 can be executed to utilize a machine learning algorithm to extend the background image I4, for filling the residual empty pixel of the mask M or the fused image I6 via a machine learning engine of the present invention to generate the output image I7. As shown in FIG. 10, sections of the pre-defined object O in the output image I7 has the actual proportion, and the distorted outlines of the stairs and the windows in the output image I7 are calibrated into the straight lines, so that the output image I7 can show the non-deformed foreground and the undistorted background.

Figure 11:
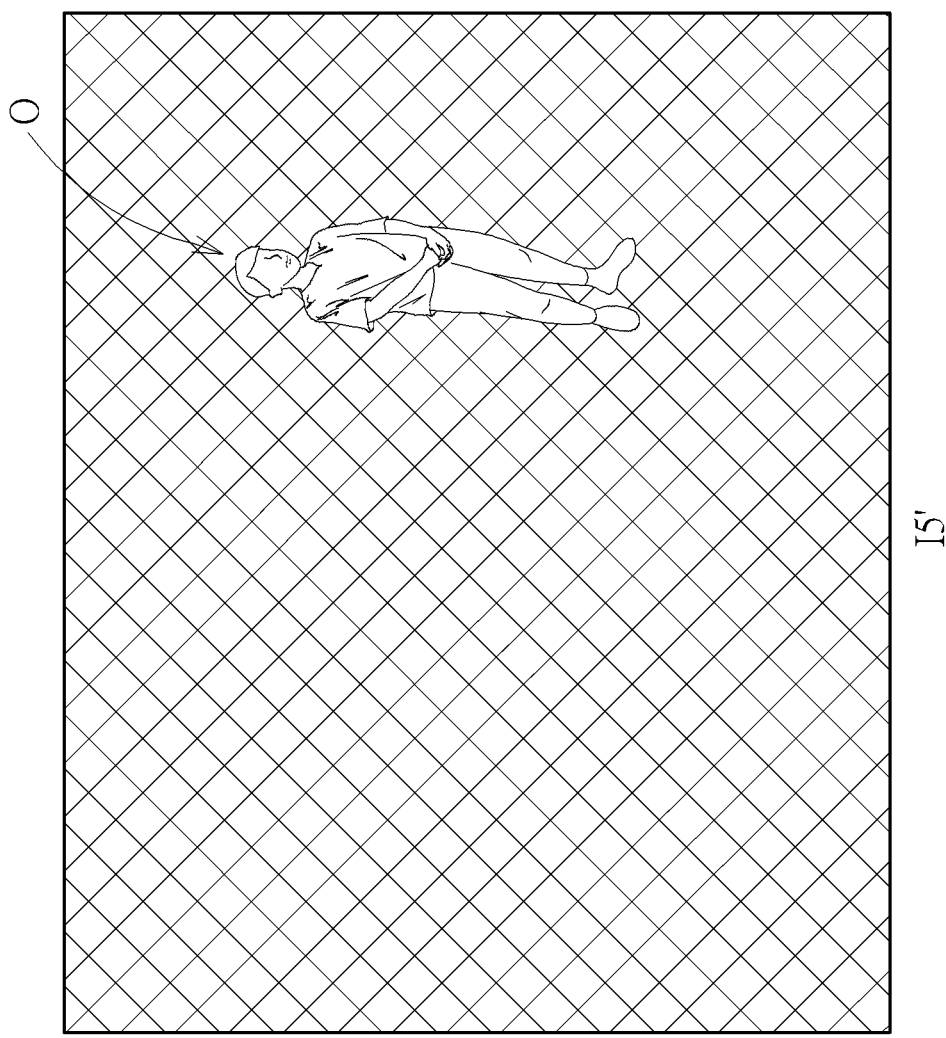

In step S102, the operation processor 14 can utilize the machine learning engine to detect the feature pixels relate to the pre-defined object O in the corrected image I2, so as to segment the foreground image I3 and the background image I4 from the corrected image I2. The machine learning engine in the present invention can be operated in a variety of prediction models to achieve a computation result of the foresaid machine learning algorithm. The machine learning engine and the machine learning algorithm of the present invention are not limited to any specific prediction model, which depend on a design demand, and a detailed description is omitted herein for simplicity. In step S104, the image calibration method can further optionally morph the feature pixels relate to the pre-defined object O in the foreground image I3 based on the pre-defined object O to generate a morphed foreground image I5', as shown in FIG. 11; the morphed foreground image I5' can be rescaled and/or shifted in accordance with the background image I4 for transforming into the calibrated foreground image I5 shown in FIG. 8.

In the present invention, the image calibration method can detect top pixels representing a top feature of the pre-defined object O, body pixels representing a body feature of the pre-defined object O, and button pixels representing a button feature of the pre-defined object O from the feature pixels related to the pre-defined object O in the foreground image I3. The pre-defined object O may be the human, and therefore the top feature, the body feature and the button feature can respectively be the face, the body and the feet of the human, which depends on the actual demand. If the pre-defined object O is the vehicle or other organism, the top feature, the body feature and the button feature can respectively be corresponding sections of the vehicle or other organism.

When the pixels of the top feature, the body feature and the button feature of the pre-defined object O are detected, the image calibration method can morph the top pixels, the body pixels and the button pixels respectively based on parameters of the top feature, the body feature and the button feature of the pre-defined object O to generate the morphed foreground image I5'. The face, the body and the feet of the human may have individual property; for example, the face may be a circular form, the feet may be a stretched form, and the body may be larger than the face and the feet. The foresaid parameters can be an external form of the top feature, the body feature and the button feature, or can be a ratio between any two of the top feature, the body feature and the button feature, or can be other possible properties. Thus, step S104 can analyze the pre-defined object O to determine a geometric center G1 of the top feature, a geometric center G2 of the body feature and a geometric center G3 of the button feature, and then morph the top pixels, the body pixels and the button pixels of the pre-defined object O according to the geometric centers G1, G2 and G3 to generate the morphed foreground image I5', so that the pre-defined object O in the morphed foreground image I5' can have a preferred shape similar to the actual form.

In steps S106 and S108, the image calibration method can determine a geometric center C1 related to the pre-defined object O in the foreground image I3, and further determine a background center C2 related to the empty pixels corresponding to the foreground image I3 in the background image I4, and then fuse the background image I4 and the calibrated foreground image I5 by aligning geometric center C1 with the background center C2 to generate the fused image I6. As shown in FIG. 6, the fused image I6 may have some residual empty pixels not overlapped by the calibrated foreground image I5. In the present invention, the image calibration method may optionally compare a size of the whole residual empty pixels in the fused image I6 with a predetermined threshold; a value and variation of the predetermined threshold can depend on the design demand. If the size of the residual empty pixels is smaller than or equal to the predetermined threshold, the mask M in the background image I4 may have the shape be similar to the shape of the pre-defined object O in the calibrated foreground image I5, and step S110 can be executed accordingly. If the size of the residual empty pixels is larger than the predetermined threshold, the shape of the mask M in the background image I4 is obviously dissimilar from the shape of the pre-defined object O in the calibrated foreground image I5, so that the morphed foreground image I5' or the calibrated foreground image I5 can be rescaled and/or shifted to move the pre-defined object O toward a suitable position and further to decrease a number of the residual empty pixels that has to be filled by step S110.

In step S110, the image calibration method can search several pixels close to the empty pixels in the background image I4, which means background pixels located on an outer edge of the mask M and relevant to the stairs, the wall and the windows in the background image I4, and estimate possible pixel values on an inner edge of the mask M via the background pixels, so as to use the estimated pixels of the background image I4 to fill the residual empty pixels in the fused image I6. Moreover, the image calibration method may optionally analyze a geometric feature distribution trend of the background image I4, such as a length of the stairs, a color of the wall or a shape of the windows, and then estimate possible pixel values on the inner edge of the mask M in accordance with the geometric feature distribution trend to fill the residual empty pixels of the fused image I6, for generating the output image I7.

In conclusion, the image calibration method and the related image calibration apparatus of the present invention can be used to calibrate the wide-angle image for transforming the deformed shape of the pre-defined object into the actual form and providing the background without the distorted outlines. The image calibration method can apply the primary lens distortion correction for the wide-angle image to acquire the corrected image for a start. The background in the corrected image can have the accurate and straight outlines, and the foreground in the corrected image may be still deformed, so that the image calibration method can segment the foreground image and the background image from the corrected image to apply the secondary distortion correction for the foreground image. Then, the calibrated foreground image can be fused with the background image to acquire the fused image, and the fused image may have the residual empty pixels due to the secondary distortion correction applied for the foreground image. Therefore, the present invention can utilize machine learning technology to predict and estimate data for filling the residual empty pixels in the fused image to generate the output image with the non-deformed foreground and the non-distorted background.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An image calibration method applied to an image calibration apparatus having a wide-angle image sensor and an operation processor, comprising:
   the wide-angle image sensor capturing and transmitting a wide-angle image to the operation processor;
   the operation processor applying primary lens distortion correction for the wide-angle image to generate a corrected image;
   the operation processor segmenting a foreground image from the corrected image to generate a background image, wherein the foreground image contains feature pixels related to a pre-defined object and the background image has empty pixels corresponding to the foreground image;
   the operation processor applying secondary distortion correction for the foreground image based on the pre-defined object to generate a calibrated foreground image;
   the operation processor fusing the background image with the calibrated foreground image to generate a fused image;
   the operation processor detecting at least one residual empty pixel not overlapped by the calibrated foreground image within the fused image; and
   the operation processor utilizing a machine learning algorithm to fill the at least one residual empty pixel of the fused image by extending the background image to provide an output image.

2. The image calibration method of claim 1, further comprising:
   the operation processor detecting the feature pixels related to the pre-defined object in the corrected image using the machine learning algorithm.

3. The image calibration method of claim 1, wherein fusing the background image with the calibrated foreground image to generate the fused image further comprises:
   the operation processor determining a background center related to the empty pixels corresponding to the foreground image in the background image;
   the operation processor determining a geometric center related to the pre-defined object in the foreground image; and
   the operation processor fusing the background image and the calibrated foreground image by aligning the background center with the geometric center.

4. The image calibration method of claim 3, wherein applying the secondary distortion correction for the foreground image based on the pre-defined object to generate the calibrated foreground image further comprises:
   the operation processor morphing the feature pixels related to the pre-defined object in the foreground image based on the pre-defined object to generate a morphed foreground image; and
   the operation processor rescaling and shifting the morphed foreground image to generate the calibrated foreground image.

5. The image calibration method of claim 4, wherein morphing the feature pixels related to the pre-defined object in the foreground image based on the pre-defined object to generate the morphed foreground image further comprises:
   the operation processor detecting top pixels representing a top feature, body pixels representing a body feature and button pixels representing a button feature in the feature pixels related to the pre-defined object; and
   the operation processor morphing the top pixels, the body pixels and the button pixels respectively based on a plurality of parameters according to the top feature, the body feature and the button feature of the pre-defined object to generate the morphed foreground image.

6. The image calibration method of claim 5, wherein morphing the feature pixels related to the pre-defined object in the foreground image based on the pre-defined object to generate the morphed foreground image further comprises:
   the operation processor morphing the top pixels, the body pixels and the button pixels according to geometric centers of the top pixels, the body pixels and the button pixels to generate the morphed foreground image.

7. The image calibration method of claim 5, wherein morphing the feature pixels related to the pre-defined object in the foreground image based on the pre-defined object to generate the morphed foreground image further comprises:
   the operation processor determining whether the pre-defined object is a human; and
   the operation processor setting the top feature, the body feature and the button feature respectively are the face, the body and the feet of the human when the pre-defined object is the human.

8. The image calibration method of claim 4, wherein rescaling and shifting the morphed foreground image to generate the calibrated foreground image further comprises:
   the operation processor comparing a size of the at least one residual empty pixel of the fused image with a predetermined threshold; and
   the operation processor rescaling the morphed foreground image in response to the size of the at least one residual empty pixel larger than the predetermined threshold.

9. The image calibration method of claim 1, wherein utilizing the machine learning algorithm to fill the at least one residual empty pixel of the fused image by extending the background image to provide the output image further comprises:
   the operation processor using several pixels of the background image adjacent to the empty pixels to fill the at least one residual empty pixel of the fused image.

10. The image calibration method of claim 1, wherein utilizing the machine learning algorithm to fill the at least one residual empty pixel of the fused image by extending the background image to provide the output image further comprises:
    the operation processor filling the at least one residual empty pixel of the fused image in accordance with a geometric feature distribution trend of the background image.

11. An image calibration apparatus, comprising:
    a wide-angle image sensor adapted to provide a wide-angle image; and
    an operation processor electrically connected to the wide-angle image sensor, the operation processor being adapted to apply primary lens distortion correction for the wide-angle image to generate a corrected image, segment a foreground image from the corrected image to generate a background image, apply secondary distortion correction for the foreground image based on the pre-defined object to generate a calibrated foreground image, fuse the background image with the calibrated foreground image to generate a fused image, detect at least one residual empty pixel not overlapped by the calibrated foreground image within the fused image, and utilizing a machine learning engine to fill the at least one residual empty pixel of the fused image by extending the background image to provide an output image;

wherein the foreground image contains feature pixels related to a pre-defined object and the background image has empty pixels corresponding to the foreground image.

12. The image calibration apparatus of claim 11, wherein the operation processor is further adapted to detect the feature pixels related to the pre-defined object in the corrected image using the machine learning engine.

13. The image calibration apparatus of claim 11, wherein the operation processor is further adapted to determine a background center related to the empty pixels corresponding to the foreground image in the background image, determine a geometric center related to the pre-defined object in the foreground image, and fuse the background image and the calibrated foreground image by aligning the background center with the geometric center.

14. The image calibration apparatus of claim 13, wherein the operation processor is further adapted to morph the feature pixels related to the pre-defined object in the foreground image based on the pre-defined object to generate a morphed foreground image, and rescale and shifting the morphed foreground image to generate the calibrated foreground image.

15. The image calibration apparatus of claim 14, wherein the operation processor is further adapted to detect top pixels representing a top feature, body pixels representing a body feature and button pixels representing a button feature in the feature pixels related to the pre-defined object, and morph the top pixels, the body pixels and the button pixels respectively based on a plurality of parameters according to the top feature, the body feature and the button feature of the pre-defined object to generate the morphed foreground image.

16. The image calibration apparatus of claim 15, wherein the operation processor is further adapted to morph the top pixels, the body pixels and the button pixels according to geometric centers of the top pixels, the body pixels and the button pixels to generate the morphed foreground image.

17. The image calibration apparatus of claim 15, wherein the operation processor is further adapted to determine whether the pre-defined object is a human, and set the top feature, the body feature and the button feature respectively as the face, the body and the feet of the human when the pre-defined object is the human.

18. The image calibration apparatus of claim 14, wherein the operation processor is further adapted to compare a size of the at least one residual empty pixel of the fused image with a predetermined threshold, and rescale the morphed foreground image in response to the size of the at least one residual empty pixel larger than the predetermined threshold.

19. The image calibration apparatus of claim 11, wherein the operation processor is further adapted to use several pixels of the background image adjacent to the empty pixels to fill the at least one residual empty pixel of the fused image.

20. The image calibration apparatus of claim 11, wherein the operation processor is further adapted to fill the at least one residual empty pixel of the fused image in accordance with a geometric feature distribution trend of the background image.

* * * * *